(12) United States Patent
Brand (10) Patent No.: US 7,957,093 B2
(45) Date of Patent: Jun. 7, 2011

(54) RECORDING HEAD WITH CURRENT CONTROLLED GAMMA RATIO

(75) Inventor: John L. Brand, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 99 days.

(21) Appl. No.: 12/503,379

(22) Filed: Jul. 15, 2009

(65) Prior Publication Data

US 2011/0013308 A1    Jan. 20, 2011

(51) Int. Cl.
*G11B 33/14* (2006.01)

(52) U.S. Cl. ...... 360/97.02; 360/59; 360/62; 360/97.03; 360/97.04; 360/313

(58) Field of Classification Search ............ None
See application file for complete search history.

(56) References Cited

U.S. PATENT DOCUMENTS

| | | | |
|---|---|---|---|
| 5,965,840 A * | 10/1999 | Nagarajan et al. | 136/203 |
| 6,084,745 A * | 7/2000 | Slezak | 360/97.02 |
| 6,385,007 B1 * | 5/2002 | Li | 360/97.02 |
| 6,452,740 B1 * | 9/2002 | Ghoshal | 360/97.02 |
| 6,842,308 B1 * | 1/2005 | Pust et al. | 360/234.7 |
| 6,867,939 B2 * | 3/2005 | Katahara et al. | 360/53 |
| 7,199,974 B1 * | 4/2007 | Alfoqaha | 360/123.09 |
| 7,474,504 B2 * | 1/2009 | Xu et al. | 360/128 |
| 7,656,619 B1 * | 2/2010 | Yan et al. | 360/294.7 |
| 2002/0071222 A1 | 6/2002 | Ghoshal | |
| 2002/0071223 A1 | 6/2002 | Ghoshal | |
| 2002/0095243 A1 | 7/2002 | Ghoshal | |
| 2004/0227913 A1 | 11/2004 | Kino | |
| 2004/0233584 A1 | 11/2004 | Liu et al. | |
| 2005/0111142 A1 * | 5/2005 | Oshima | 360/313 |
| 2005/0219736 A1 * | 10/2005 | Lee et al. | 360/75 |
| 2006/0002273 A1 * | 1/2006 | Takahashi et al. | 369/101 |
| 2006/0056113 A1 * | 3/2006 | Fukushima et al. | 360/324.1 |
| 2006/0072382 A1 | 4/2006 | Wakabayashi et al. | |
| 2007/0008656 A1 | 1/2007 | Liu et al. | |
| 2007/0146920 A1 | 6/2007 | Kitamura et al. | |
| 2008/0144214 A1 | 6/2008 | Ambrose | |
| 2008/0174907 A1 | 7/2008 | Johnston et al. | |
| 2008/0239564 A1 | 10/2008 | Farquhar et al. | |

* cited by examiner

*Primary Examiner* — Dismery E Mercedes
(74) *Attorney, Agent, or Firm* — David C. Bohn; Westman, Champlin & Kelly P.A.

(57) ABSTRACT

A data recording component includes a read transducer and a write transducer. A thermoelectric device generates heat flow between the read transducer and the write transducer. The heat flow is conducted by thermal conductors. A controlled current source provides current to the thermoelectric device that changes polarity to change directions of the heat flow and thereby vary a gamma ratio of transducer protrusion.

20 Claims, 10 Drawing Sheets

RECORDING HEAD WITH CURRENT CONTROLLED GAMMA RATIO

BACKGROUND OF THE INVENTION

In the field of data recording components, heating or cooling of a read/write transducer can thermally vary protrusion. A read head and a pole tip of a write head generally move together, and a ratio gamma (Γ) of protrusion tends to remain constant regardless of whether the read/write head is heated or cooled. With increasing areal density of magnetic media, there is a desire for improved control over protrusion.

Embodiments of the present invention provide solutions to these and other problems, and offer other advantages over the prior art.

SUMMARY OF THE INVENTION

Disclosed is a data recording component and a method therefor. The data recording component comprises a head. The data recording component comprises read and write transducers mounted on the head. The read transducer has a reader protrusion relative to an air bearing surface of the head. The write transducer has a writer tip protrusion.

The data recording component comprises a Peltier device. The Peltier device is mounted on the head. The Peltier device generates an internal heat flow that is internal to the Peltier device between first and second Peltier junctions.

The data recording component comprises a first thermal conductor. The first thermal conductor conducts a first external heat flow between the first junction and the read transducer. The data recording component comprises a second thermal conductor. The second thermal conductor conducts a second external heat flow between the second junction and the write transducer.

The data recording component comprises a controlled current source. The controlled current source provides a current to the Peltier device. The current changes polarity to change directions of the internal and external heat flows and thereby vary a gamma ratio.

Other features and benefits that characterize embodiments of the present invention will be apparent upon reading the following detailed description and review of the associated drawings.

DETAILED DESCRIPTION OF ILLUSTRATIVE EMBODIMENTS

In the aspects described below in connection with FIGS. 3-9, a read transducer is thermally decoupled from a write transducer. In the aspects described below, the thermal decoupling enables independent control of read transducer temperature and write transducer temperature. In the aspects described below, a Peltier device comprises a first Peltier junction thermally coupled to the read transducer, and a second Peltier junction thermally coupled to the write transducer. In the aspects described below, a controlled current source provides current to the Peltier device, and the current changes polarity to change a direction of heat flow, and thereby vary a gamma ratio in real time. Simultaneously, the read transducer is cooled while the write transducer is heated to provide protrusion of the write transducer simultaneously with recession of the read transducer when the current has a first polarity. Simultaneously, the write transducer is cooled while the read transducer is heated to provide protrusion of the read transducer simultaneously with recession of the write transducer when the current has a second polarity that is opposite the first polarity.

The protrusion and recession of the transducers are a function of different coefficients of thermal expansion in the substrate and layers that are stacked up to form the read and write transducers. The Peltier device provides a temperature in the read transducer that is different than a temperature in the write transducer so that thermal expansions near the read transducer and write transducer are different from one another. The temperature difference is reversed by reversing current flow in the Peltier device, and thus optimized profiles of protrusion are obtained, using thermal expansions, depending on whether the data recording component is idle, reading or writing.

Figure 1:
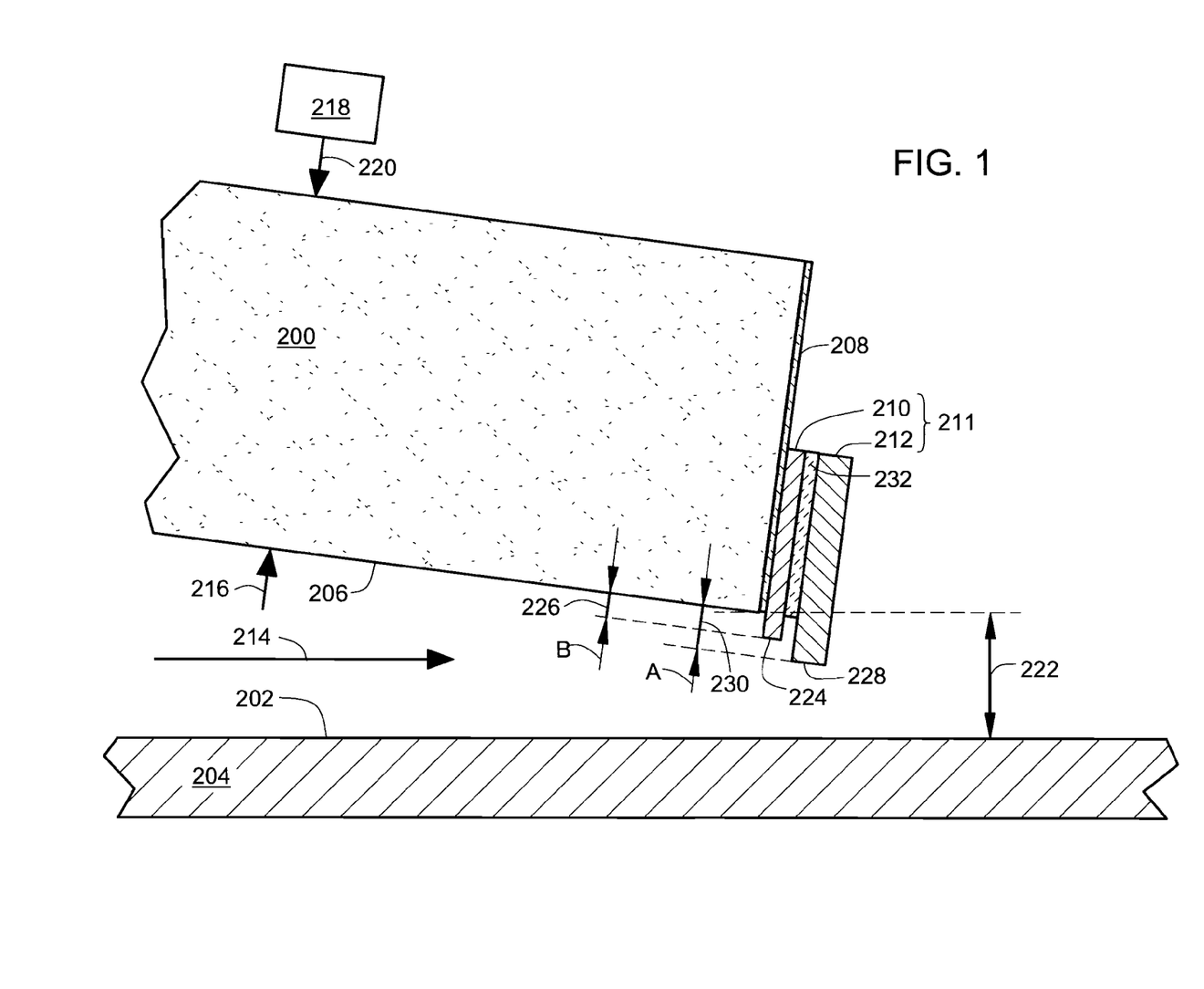
FIG. 1 schematically illustrates a head and an associated lack of independent control of thermal transducer protrusion.
Figure 2:
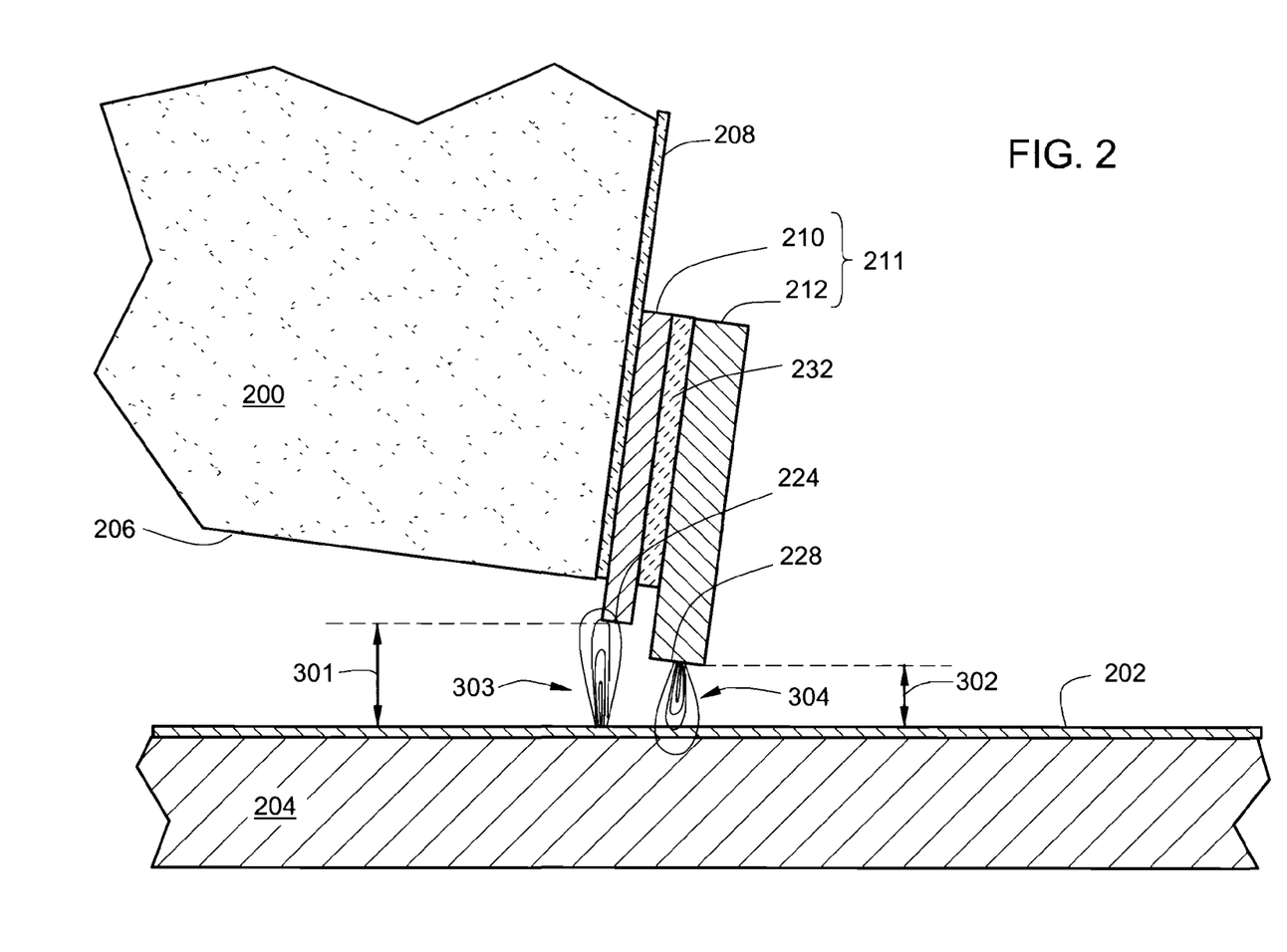
FIG. 2 schematically illustrates spacings between a read/write transducer and a storage media surface of FIG. 1.

In the aspects described below in connection with FIGS. 3-9, the problems described in connection with FIGS. 1-2 are avoided.

FIG. 1 schematically illustrates a head 200 and problems associated with a lack of independent control of thermal transducer protrusions. The head 200 (also called slider 200) flies over a spinning storage media surface 202 of a disc 204. The head 200 has an air bearing surface (ABS) 206 and a trailing surface 208. A read transducer 210 and a write transducer 212 are deposited in a stacked arrangement on the trailing surface 208. Typically, the read transducer 210 is mounted closer to the trailing surface 208, and the write transducer 212 is mounted further from the trailing surface 208, however the stacking order of the read transducer 210 and the write transducer 212 can be reversed. The assembly of the read transducer 210 and the write transducer 212 are referred to here collectively as a read/write transducer 211.

The spinning media surface 202 induces an air flow 214. The air bearing surface 206 interacts with the air flow 214 to produce an upward lift force 216 on the air bearing surface 206 of the head 200. A mechanical suspension 218 exerts a downward suspension force 220 on the head 200. As a result of a balance between the upward lift force 216 and the downward suspension force 220, the head flies at a head spacing 222 above the media surface 202. The head spacing 222 is typically variable and dependent upon temperature and a speed of the spinning media surface 202.

The write transducer 212 has a writer tip 228 that protrudes past the air bearing surface 206 by a distance A referred to here as writer tip protrusion 230. The read transducer 210 has a reader edge 224 that protrudes past the air bearing surface 206 by a distance B referred to here as reader edge protrusion 226. It will be understood by those skilled in the art that spacings such as protrusions A and B are shown enlarged for clarity. Both the reader edge protrusion 226 and the writer tip protrusion 230 are variable and dependent upon electrical power P currently dissipated near the transducers 210, 212. A ratio of change of the writer tip protrusion 230 to the change of the reader edge protrusion 226 is referred to here as gamma (Γ), as set forth in Equation 1:

$$\Gamma = \Delta A(P)/\Delta B(P) \qquad \text{Equation 1}$$

Although the writer tip protrusion A and the reader edge protrusion B tend to be strongly sensitive to power P, much of the power sensitivities of A and B tends to correlate and cancel out in the ratio Γ. The read and write transducers 210, 212 are closely coupled thermally to one another, and their temperatures tend to track one another. The ratio Γ tends to be set by the temperature coefficient of expansion of materials, and thicknesses and sizes of layers of the materials deposited on the trailing surface 208. As temperature increases, the writer tip protrusion A and the reader edge protrusion B both tend to increase, while the ratio Γ remains relatively constant.

As a protrusion control strategy, a heater or a cooler (not illustrated in FIG. 1) can be deposited adjacent the read/write transducer 211 to collectively control a temperature of the read/write head 211 and thereby control both reader edge and writer tip protrusions A and B. However, neither heating nor cooling of the read/write head 211 can effectively control Γ. Neither heating nor cooling of the read/write head 211 can provide independent control of writer tip protrusion A without significantly changing reader edge protrusion B. The read transducer 224 and the write transducer 228 are closely thermally coupled to one another by thermal coupling through a thin layer 232. The thin layer 232 has a low thermal resistance. There is a desire to independently control protrusions A and B in order to improve performance with high bit density media, however, such independent control of protrusions A and B is not available in the arrangement in FIG. 1, even when a heater or cooler is included. This problem is described below in connection with FIG. 2. This problem is relieved as explained below in connection with FIGS. 3-9.

FIG. 2 schematically illustrates spacing between the read/write transducer 211 and the storage media surface 202 of FIG. 1. There is a read transducer edge spacing 301 between the reader edge 224 and the storage media surface 202. There is a write transducer tip spacing 302 between writer tip 228 and the storage media surface 202. The spacings 301, 302 in FIG. 2 are a function of the head spacing 222 (FIG. 1) and the transducer protrusions A and B (FIG. 1).

The storage media surface 202 produces a read magnetic field 303 that magnetically interacts with the reader edge 224 for reading data. The writer tip 228 produces a write magnetic field 304 that interacts with the storage media surface 202 for writing data. At the position of the reader edge 224, the read magnetic field 303 becomes weaker and more spread out as the read transducer edge spacing 301 increases. At the position of the media surface 202, the write magnetic field 304 becomes weaker and more spread out as the write head tip spacing 302 increases.

There is an optimum read transducer edge spacing 301 at which the reader edge 224 is far enough away from the storage media surface 202 to avoid damaging contact with the storage media surface 202 and close enough to the storage media surface so that a width of a magnetic field 303 that emanates from the storage media surface 202 is narrow enough at the reader edge 224 to accommodate a high bit density and strong enough to be read by the read head 210. Likewise, there is an optimum write transducer tip spacing 302 at which the writer tip 228 is far enough away from the storage media surface 202 to avoid damaging contact with the storage media surface 202 and close enough to the storage media surface so that a width of a magnetic field 303 at the storage media surface is narrow enough to write at a high bit density and strong enough to reliably write.

During write time intervals, there is a desire to control, in real time, the write transducer tip spacing 302 to the optimum write tip spacing while simultaneously increasing the read transducer edge spacing 301 to avoid contact. During read time intervals, there is a desire to control, in real time, the read transducer edge spacing 301 to an optimum read edge spacing while simultaneously increasing the write tip spacing 302 to avoid contact. The close thermal coupling of layer 232 in FIGS. 1-2 prevents such real time control. Independent control of spacings A and B in real time is desired but not available in FIGS. 1-2.

Figures 3A, 3B:
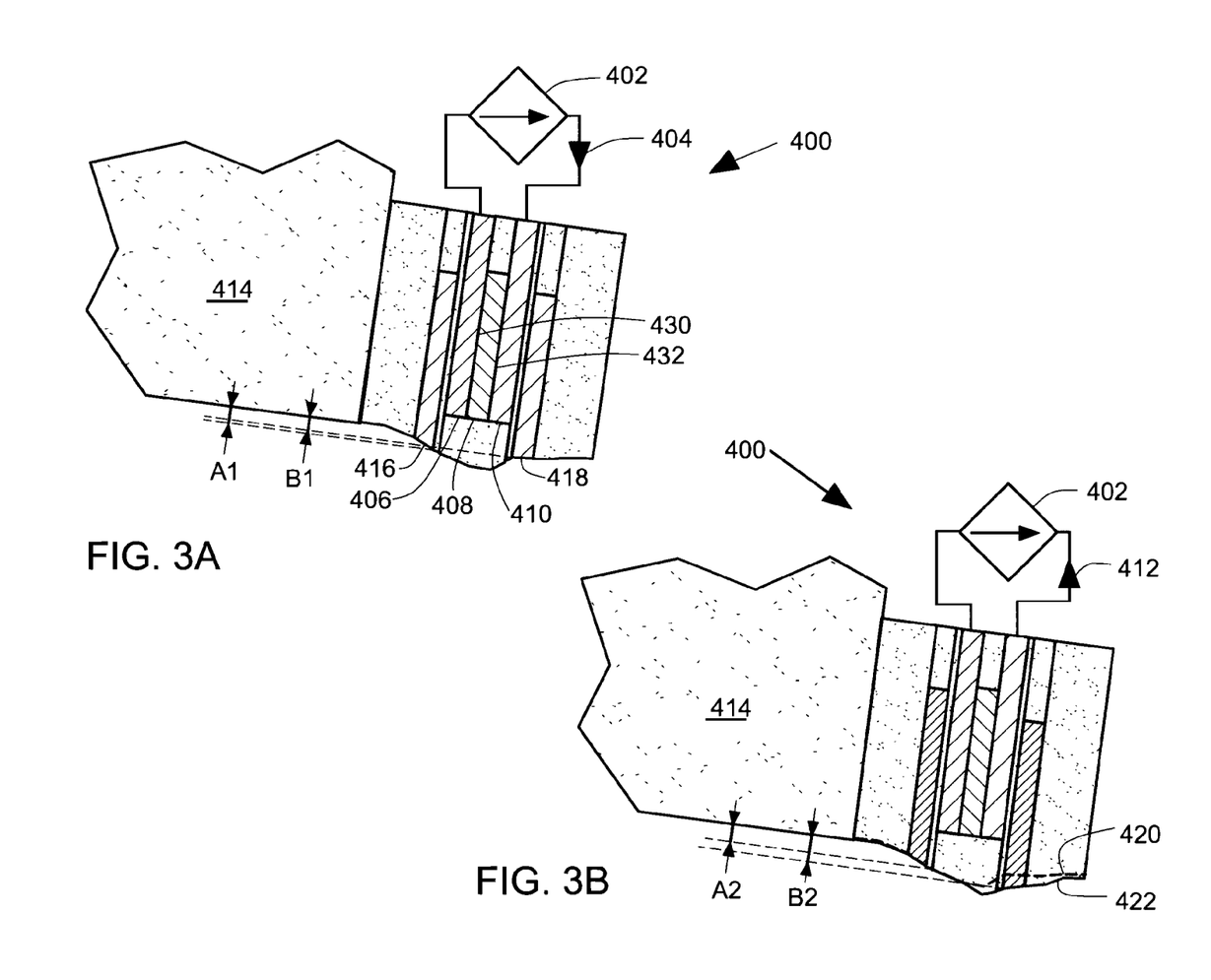
FIGS. 3A, 3B, 3C, 4A, 4B illustrate aspects of a data recording component that includes a Peltier device positioned between transducers.

FIGS. 3A and 3B illustrate a data recording component 400. In FIG. 3A, the data recording component 400 is illustrated with a controlled current source 402 providing current 404 with a first polarity to a Peltier device that comprises layers 406, 408, 410. In FIG. 3B, the data recording component 400 is illustrated with the controlled current source 402 providing current 412 with a second polarity (opposite the first polarity) to the Peltier device 406, 408, 410.

The data recording component 400 comprises a head 414. A read transducer 416 is mounted on the head 414. A write transducer 418 is mounted on the head 414.

In FIG. 3A, with current 404 having a first polarity and a first controlled current amplitude, the read transducer 416 has a reader edge protrusion A1 relative to the head 414 and the write transducer 418 has a writer tip protrusion B1 relative to the head 414. In FIG. 3B, with current 412 having a second polarity and a second controlled current amplitude, the read transducer 416 has a reader edge protrusion A2 relative to the head 414 and the write transducer 418 has a writer tip protrusion B2 relative to the head 414. As illustrated in FIG. 3A, the reader edge protrusion A1 is larger than the writer tip protrusion B1. As illustrated in FIG. 3B, the reader edge protrusion A2 is smaller than the writer tip protrusion B2. A broken line 420 in FIG. 3B illustrates a position of the component 400 in FIG. 3A which can be compared to a position 422 of the component 400 in FIG. 3B. As illustrated in FIGS. 3A and 3B, a current polarity and a current amplitude can be controlled by the controlled current source 402 to independently adjust a ratio gamma of a reader edge protrusion and a writer pole tip protrusion.

Figure 3C:
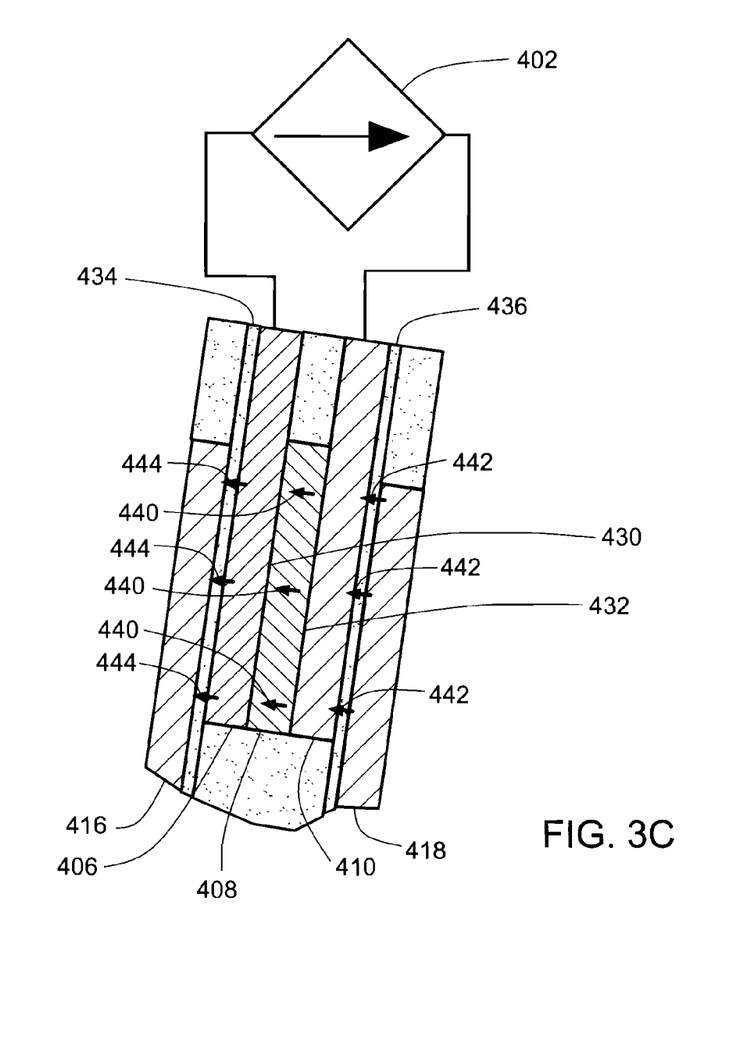

As illustrated in FIG. 3C, the Peltier device 406, 408, 410 generates an internal heat flow (indicated by arrows 440) that is internal to the Peltier device between first Peltier junction 430 and the second Peltier junction 432. The internal heat flow 440 generates a temperature difference that induces external heat flows 442, 444. The external heat flow 442 cools the write transducer 418. The external heat flow 444 heats the read transducer 416. The amount of the heat flow depends on the amount of current supplied by the controlled current source 402. The directions of the heat flows 440, 442, 444 can be reversed by reversing the direction (polarity) of current supplied by the controlled current source 402.

The Peltier device comprises a first metal contact layer 406 and a second metal contact layer 410 that are electrically connected to the controlled current source 402 and that carry current. According to one aspect, the metal contact layers 406, 410 comprise copper or a copper alloy. Other metals known for use with Peltier devices can also be used. The Peltier device comprises a thermoelectric semiconductor layer 408. According to one aspect, the thermoelectric semiconductor layer 408 comprises bismuth telluride. According to another aspect, the thermoelectric semiconductor layer 408 comprises lead telluride, silicon germanium or other known thermoelectric semiconductor materials. According to yet another aspect, the material in the thermoelectric semiconductor layer is doped to have either "P" or "N" characteristics which control the direction of heat flow in relation to the direction of controlled current flow.

The thermoelectric semiconductor layer 408 electrically contacts the first metal contact layer 406, forming a first junction 430. The thermoelectric semiconductor layer 408 electrically contacts the second metal contact 410, forming a second junction 432. Controlled electric current flows through the junctions 430, 432 and the semiconductor layer 408.

A first thermal conductor layer 434 conducts the first external heat flow 444 between the first junction 430 and the read transducer 416. A second thermal conductor layer 436 conducts the second external heat flow 442 between the second junction 432 and the write transducer 418. According to one aspect, the first and second thermal conductive layers 434, 436 comprise alumina which is electrically insulating, even in very thin layers. The first and second conductive layers 434, 436 are made sufficiently thin in order to have low thermal resistance, in other words, low resistance to the flow of heat. According to one aspect, the first and second conductive layers have a thickness in the range of 2 to 1000 nanometers.

According to another aspect, the thermal conductive layers 434, 436 are not formed of a single material, but include sublayers formed of multiple materials to provide the desired high thermal conductivity and electrical insulation properties. According to one aspect, a thermal conductive layer comprises outer thin sublayers of electrical insulation material and a thick central core sublayer of an electrical conductor with a high thermal conductivity and a high thermal coefficient of thermal expansion. According to another aspect, a thermal conductive layer comprises outer thin sublayers of electrical insulation material and a thick central core sublayer of an electrical conductor with a high thermal conductivity and a low thermal coefficient of thermal expansion. The sublayer materials of the thermal conductive layers 434, 436 can thus be used to partially control the thermal protrusion characteristics of the data recording component.

The controlled current source 402 provides a current to the Peltier device that changes polarity to change directions of the internal and external heat flows and thereby vary a gamma ratio. The current has a first polarity during data reading, and the current has a second opposite polarity during data writing. The gamma ratio comprises a ratio of writer tip protrusion change to reader edge protrusion change. According to one aspect, the current is shut off during idle periods when neither data reading nor data writing is taking place, and the current is temporarily turned on during data reading and data writing.

FIGS. 3A-3B show the cross-section of the head profile with a Peltier device in between the writer and the reader with the cooling side facing the writer on the trailing face of the head. The two profiles 420, 422 are for the driving the Peltier in the forward (cooling the writer) and the backward (cooling the reader) directions. In steady state, the reader position does not move. In the Peltier mode, the materials on the left of the writer are slightly contracted pulling the writer closer to the non-actuated plane. In the reverse mode, the thermal expansion causes the writer to protrude farther than the reader.

Figures 4A, 4B:
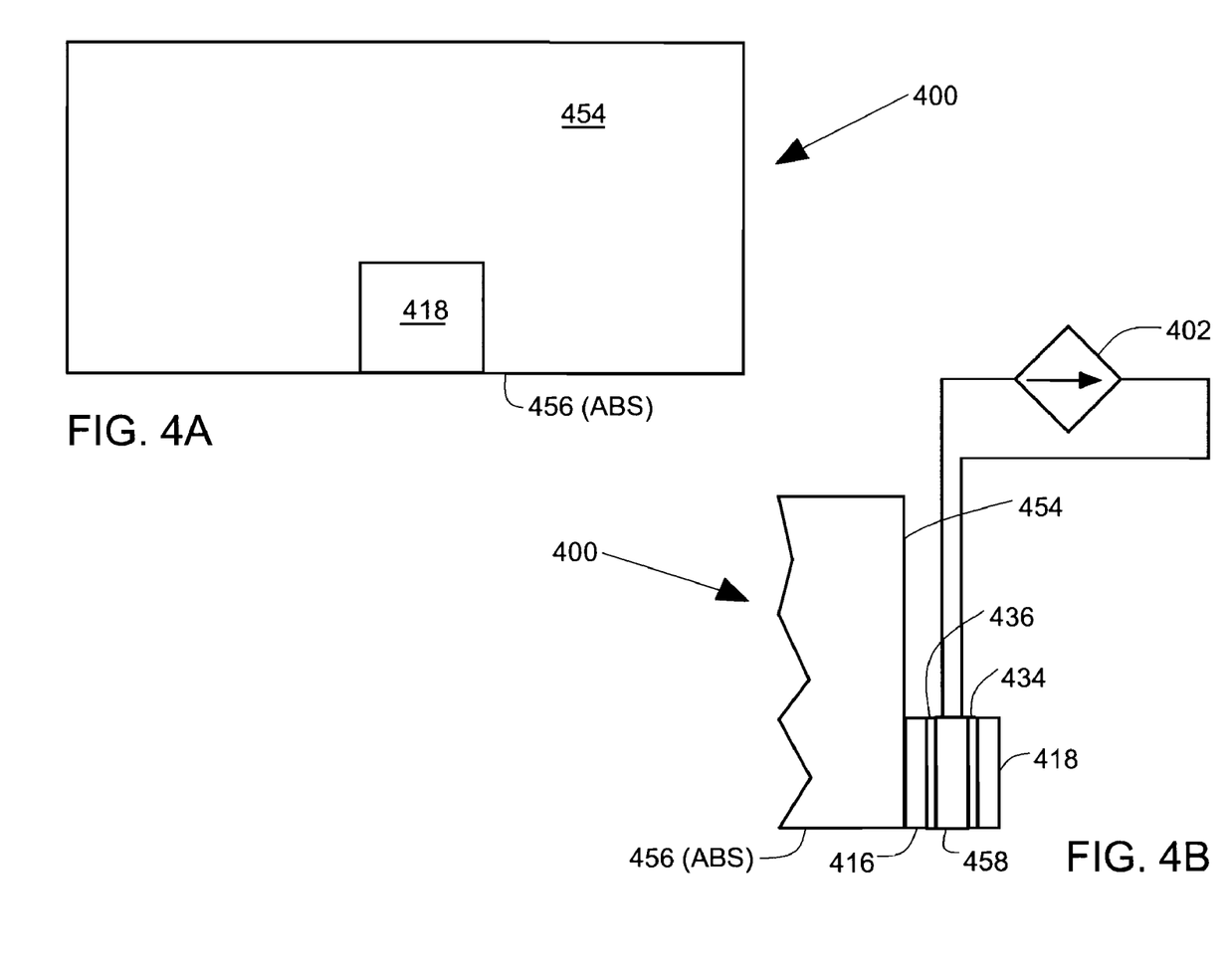

FIG. 4A illustrates a view of a trailing surface 454 of the data recording component 400 (FIGS. 3A, 3B, 3C). The transducer 418 is centrally positioned adjacent an air bearing surface 456. As illustrated in FIG. 4B, a Peltier device 458 (which includes layers 406, 408, 410 shown in FIG. 3A) is positioned between the transducer 418 and the transducer 416. The thermal conductor layers 434, 436 conduct heat between the Peltier device 458 and the transducer 416, 418. The controlled current source 402 provides a controlled current to the Peltier device 458.

Figure 5A:
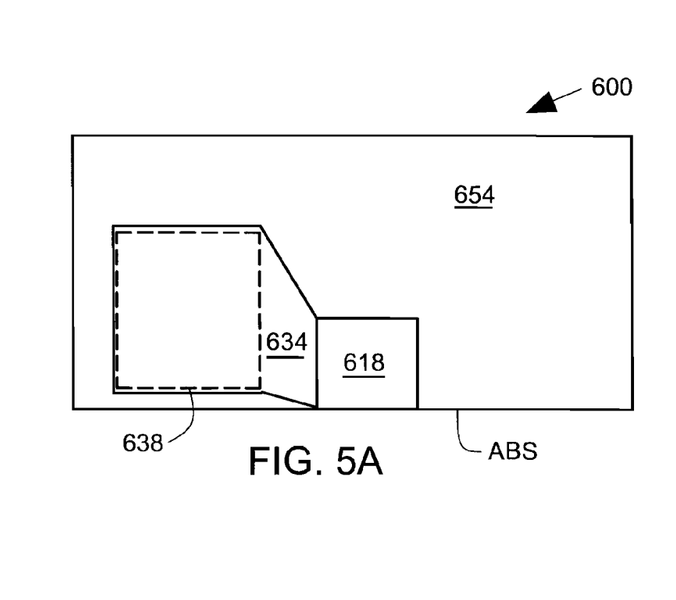
FIGS. 5A, 5B, 5C illustrate aspects of a data recording component in which a Peltier device is thermally coupled by heat conductor layers that are positioned between transducer layers that are spaced apart from the Peltier device.
Figure 5B:
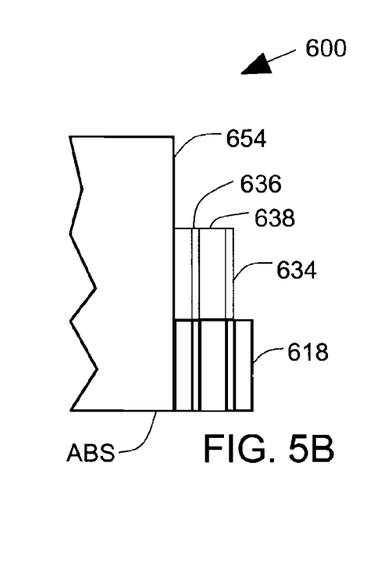
Figure 5C:
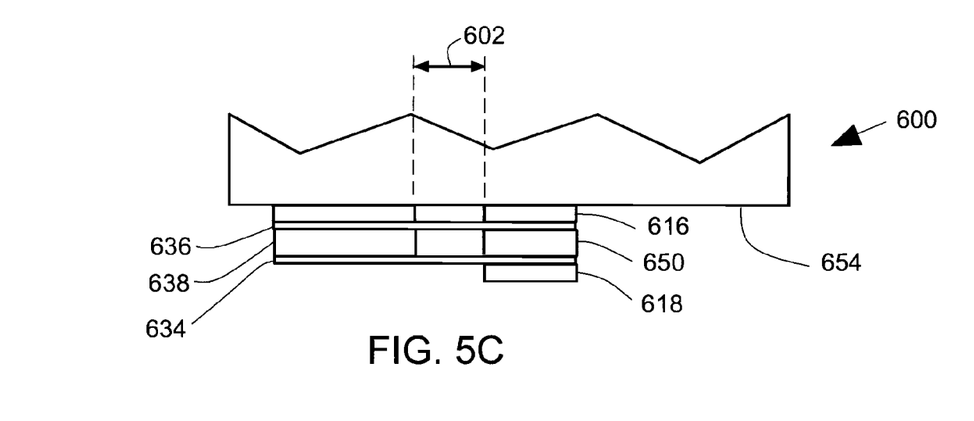

FIGS. 5A, 5B, 5C illustrate a data recording component 600 in which a Peltier device 638 is spaced apart by a spacing 602 from transducers 616 and 618 on a trailing surface 654. Thermal conductor layers 634, 636 extend across the spacing 602 and thermally couple to opposite sides of the Peltier device 638. The thermal conductor layer 634 thermally couples to the transducer 618. The thermal conductor layer 636 thermally couples to the transducer 616. According to one aspect, the thermal conductor layers 634, 636 comprise metal layers and are electrically isolated from the transducer 616, 618 by thin layers of alumina which, due to the thinness, are good thermal conductors. According to another aspect the thermal conductor layers 634, 636 comprise copper or aluminum. The thin layers of alumina can be formed as part of the transducers 616, 618.

According to one aspect, the transducers 616, 618 are thermally insulated from one another by a thick layer 650 of alumina which, due to its thickness, is a thermal insulator. The thickness of layer 650 exceeds 1000 nanometers. According to another aspect, thermal insulation layer 650 retards a first leakage heat flow between the first thermal conductor layer 636 and the write transducer 618, and retards a second leakage heat flow between the second thermal conductor layer 638 and the read transducer 616.

In FIGS. 5A, 5B, 5C, the thermal heat conductor layers 634, 636 are positioned between the transducer layers 616, 618. The transducer layers 616, 618 are positioned outside of the thermal heat conductor layers 634, 636. Alternatively, as shown in FIG. 6, positions of thermal heat conductor layers and transducer layers are reversed relative to the positions in FIG. 5.

Figure 6A:
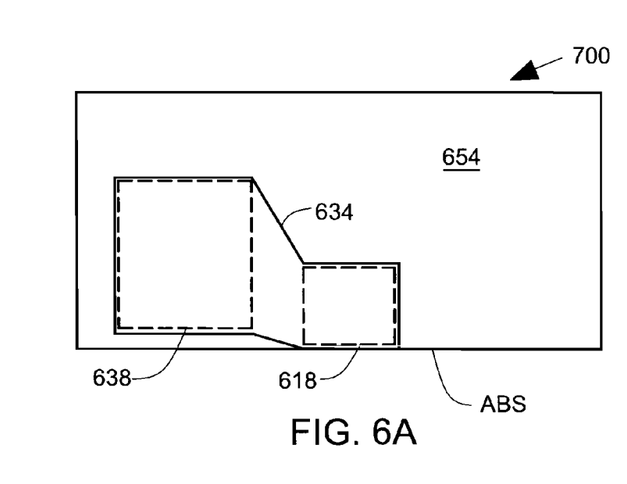
FIGS. 6A, 6B, 6C illustrate aspects of a data recording component in which a Peltier device is thermally coupled by heat conductor layers that are positioned outside of transducer layers that are spaced apart from the Peltier device.
Figure 6B:
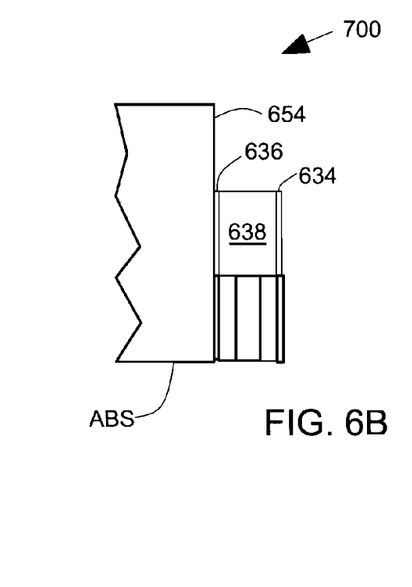
Figure 6C:
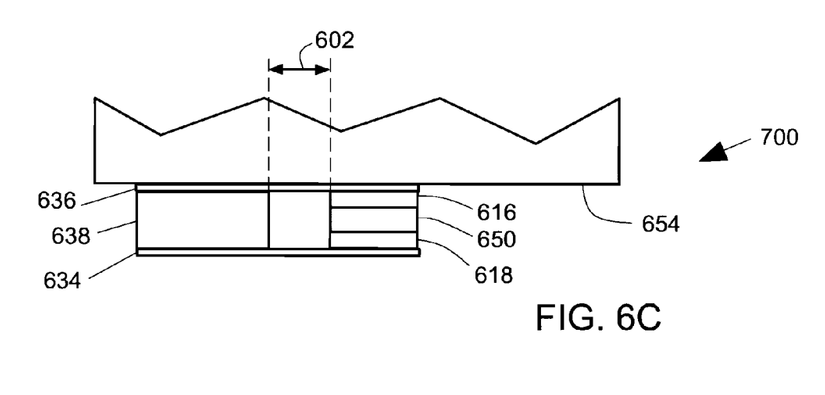

FIGS. 6A, 6B, 6C illustrate a data recording component 700 in which a Peltier device 638 is spaced apart by a spacing 602 from transducers 616 and 618 on a trailing surface 654. Reference numbers used in FIGS. 6A, 6B, 6C that are the same as reference number used in FIGS. 5A, 5B, 5C indicate substantially the same elements, and for the sake of brevity are not repeated here. In FIG. 6, the thermal heat conductor layers 634, 636 are positioned outside of the transducer layers 616, 618. In FIGS. 6A, 6B, 6C, the transducer layers 616, 618 are positioned between the thermal heat conductor layers 634, 636. In other respects, the data recording component 700 is similar to the data recording component 600.

Figure 7:
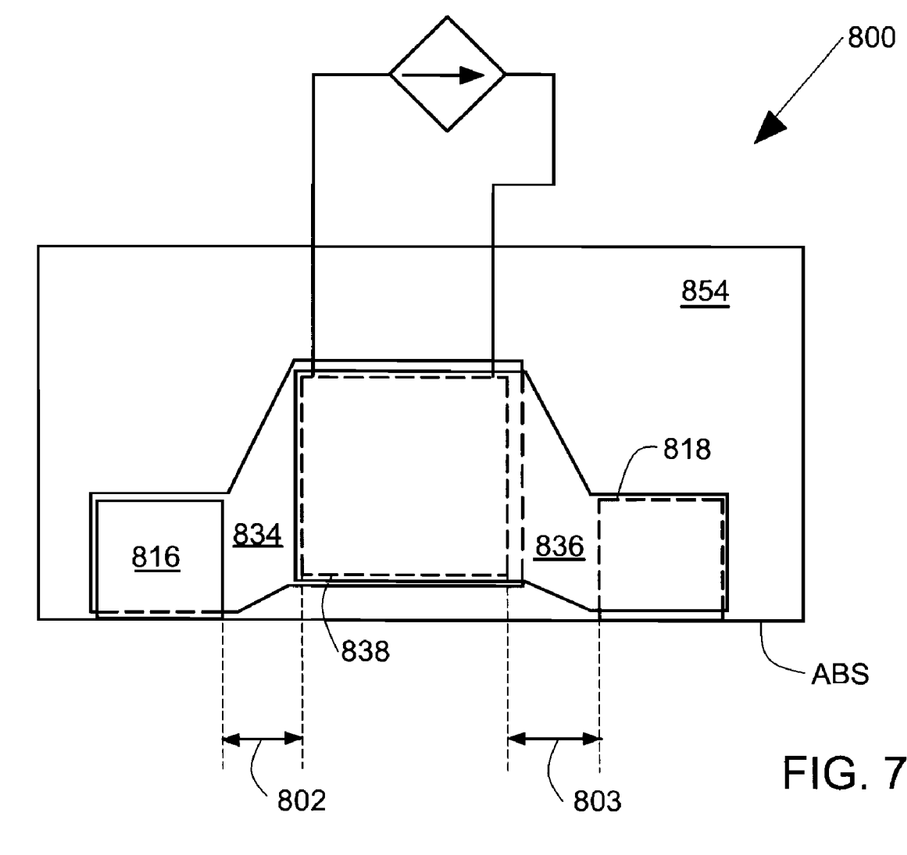
FIG. 7 illustrates aspects of a data recording component on a trailing surface in which a Peltier device is thermally coupled by heat conductor layers to transducer layers that are spaced apart from one another on a trailing surface.

FIG. 7 illustrates a data recording component 800 with a trailing surface 854 on which a Peltier device 838 is spaced apart by a spacing 802 from a transducer 816, and in which the Peltier device 838 is spaced apart by a spacing 803 from a transducer 818. A first thermal conductive layer 834 extends across the spacing 802 and thermally couples a first side of the Peltier device 838 to the transducer 816. A second thermal conductive layer 836 extends across the spacing 803 and thermally couples a second side of the Peltier device 838 to the transducer 818. Thermal paths for heat flows through the thermal conductive layers 834, 836 are relatively long, and the thermal conductive layers 834, 836 are formed of metal to provide high thermal conductivity. Thin thermal conductive layers (not illustrated in FIG. 7) formed of electrically insulating material are placed between the Peltier device 838 and the metal thermal conductive layers 834, 836 to electrically isolate the Peltier device 838 from the transducers. Additional or alternative thin electrically insulating thermal conductive layers (not illustrated) can be used to electrically isolate the transducers 816, 818 from the metal thermal conductive layers 834, 836. In the component shown in FIG. 7, the transducers 816, 818 access different tracks on a storage media surface.

Figure 8A:
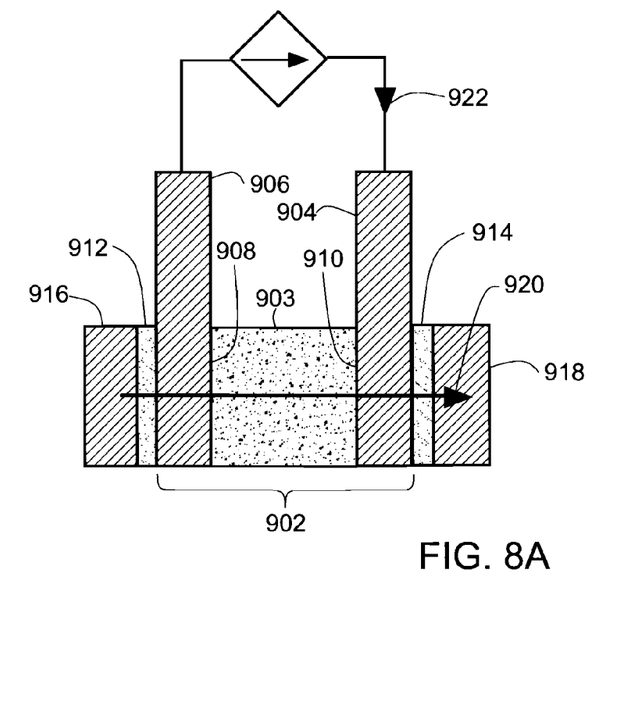
FIGS. 8A, 8B illustrate alternative internal structures for Peltier devices.
Figure 8B:
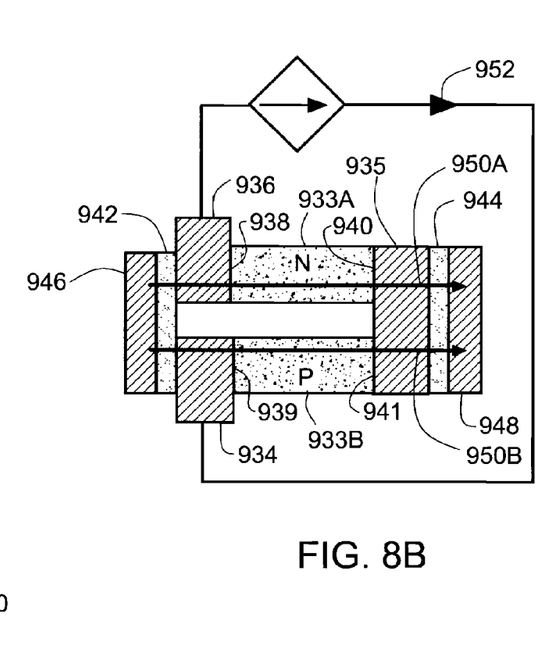

FIGS. 8A, 8B illustrate alternative internal structures for Peltier devices. In FIG. 8A, a single Peltier device 902 comprises a thermoelectric semiconductor layer 903 and two metal contact layers 904, 906. Two Peltier junctions 908, 910 are formed. Heat conductor layers 912, 914 conduct heat between the Peltier device 902 and transducers 916, 918. The heat conductor layers 912, 914 comprise material that is electrically insulating, but that is sufficiently thin to have low thermal resistance to function as heat conductor layers. The Peltier device 902 produces a heat flow indicated by an arrow 920, cooling a first transducer 916 and heating a second transducer 918. A controlled electric current 922 flowing through the Peltier device 902 is reversible in order to reverse the heat flow 920 and to adjust gamma (Γ) in real time. The Peltier device structure shown in FIG. 8A is applicable to the examples shown in FIGS. 3-7.

In FIG. 8B, a double Peltier device comprises two thermoelectric semiconductor layers 933A, 933B. Thermoelectric semiconductor layer 933A comprises an N-type semiconductor material, and thermoelectric semiconductor layer 933B comprises a P-type semiconductor material. Metal contact layers 935, 936 contact the thermoelectric semiconductor layer 933A, forming two Peltier junctions 938, 940. Metal contact layers 935, 934 contact the thermoelectric semiconductor layer 933B, forming two Peltier junctions 939, 941. Heat conductor layers 942, 944 conduct heat between the double Peltier device and transducers 946, 948. The heat conductor layers 942, 944 comprise material that is electrically insulating, but that is sufficiently thin to have low thermal resistance to function as heat conductor layers. The double Peltier device produces heat flows indicated by arrows 950A, 950B, cooling a first transducer 946 and heating a second transducer 948. A controlled electric current 952 flowing through the Peltier devices is reversible in order to reverse the heat flows 950A, 950B and to adjust gamma (Γ) in real time. The controlled electric current 952 flows in opposite directions in thermoelectric semiconductor layers 933A, 933B, however, the semiconductor layers 933A, 933B are oppositely doped (P and N type) so that both heat flows 950A, 950B are in the same direction as shown. The structure shown in FIG. 8B is applicable to the examples shown in FIGS. 3-7.

Figure 9:
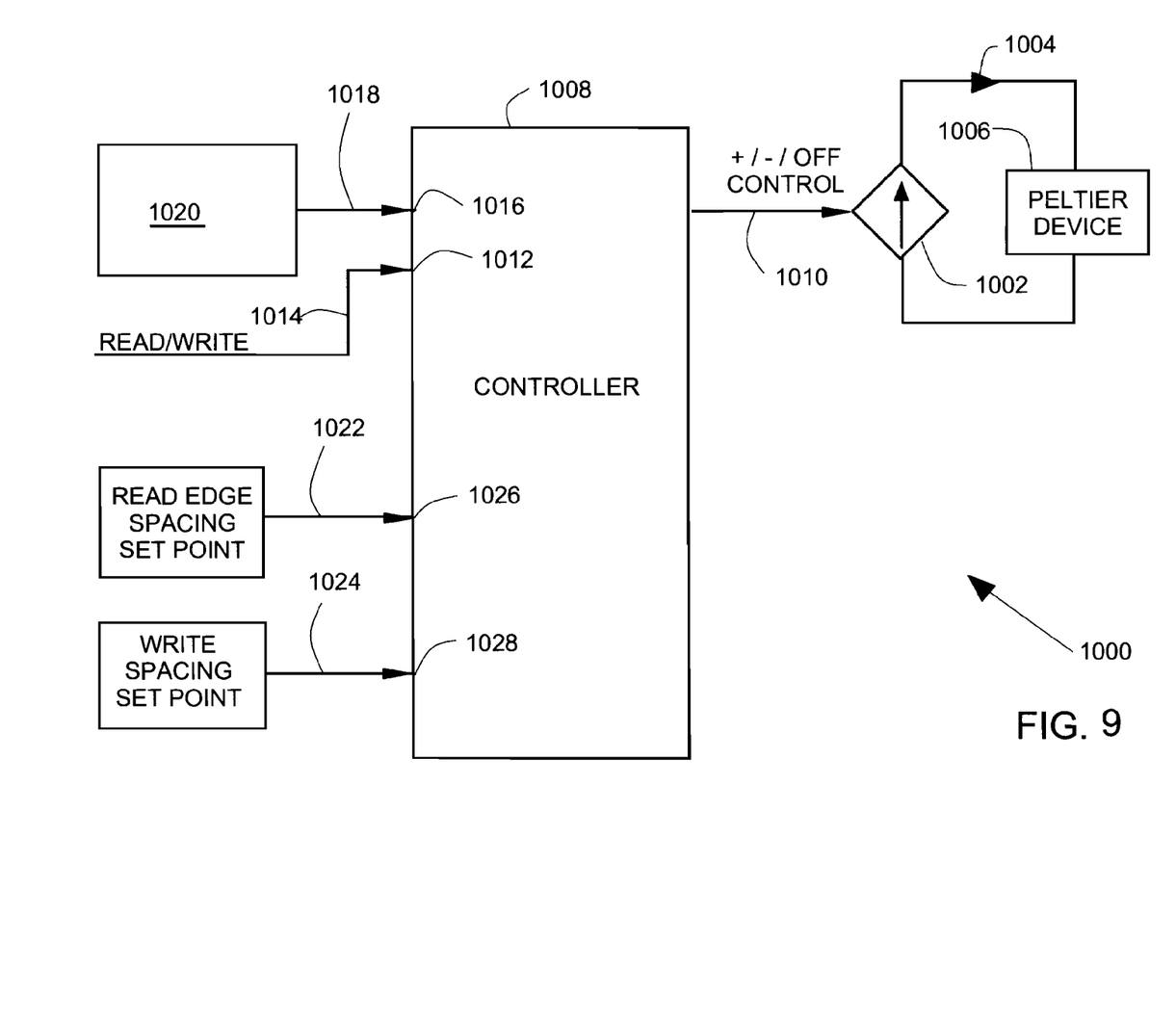
FIG. 9 illustrates a control system that controls a controlled current source that provides a controlled current to a Peltier device.

FIG. 9 illustrates a control system 1000 that controls a controlled current source 1002 that provides a controlled current 1004 to a Peltier device 1006. The control system 1000 can be used, for example, with data recording components illustrated in FIGS. 3-8 to control Γ. A controller 1008 provides an electrical control output 1010 to the controlled current source 1002. The controlled current source 1002 comprises a bipolar controlled current source and controls both the polarity and amplitude of the controlled current 1004.

According to one aspect, the controlled current 1004 can be set to substantially zero during time intervals when there is no need for current through the Peltier device 1006, such as time intervals when the data storage device is idle and is neither reading nor writing data. Changing the polarity of the controlled current 1004 changes the direction of heat flow through the Peltier device 1006. Changing the amplitude and polarity of the controlled current 1004 provides real time control of the ratio gamma (Γ) to separately optimize read edge and write pole tip protrusions in read and write intervals.

The controller 1008 comprises a read/write input 1012 that receives a read/write signal 1014 from a data storage device. The controller 1008 controls polarity of the control output 1010 as a function of the read/write signal 1014.

The controller 1008 comprises a reader edge protrusion input 1016 that receives a read signal 1018 from a read transducer 1020. The read transducer 1020 provides the read signal 1018, and the read signal has an amplitude that is representative of a read transducer edge spacing (such as read transducer edge spacing 301 in FIG. 2 for example). Alternatively, the reader edge protrusion input 1016 can be connected to a gain setting of a variable gain amplifier (VGA) in a read channel, and the gain setting of the variable gain amplifier can be coupled to the input 1016. The gain setting of the VGA is representative of read transducer edge spacing. The controller 1008 can calculate read transducer edge spacing from the gain setting of the VGA.

The controller 1008 receives a read edge spacing set point 1022 at an input 1026 and a write tip spacing set point 1024 at an input 1028. During a read interval, the controller 1008 controls the read transducer edge spacing to the read edge spacing set point 1022. During a write interval, the controller 1008 controls the write tip spacing to the write tip spacing set point 1024. The controller 1008 calculates the write tip spacing as a function of most recent transducer read edge spacing sensed at input 1016 and known thermal expansion characteristics of the read/write transducer. According to one aspect, the controller 1008 comprises an adaptive controller that adapts its control strategy as a function of a data input on transducer crashes and read signal quality (not illustrated).

In combination with a Peltier device as described above, resistive heating elements (which are not Peltier devices) can be used to move the reader and writer closer to the disc surface. Resistive heating devices move both the reader and writer in a mostly linear and proportional manner. Given a specific design of a data recording component, the writer and reader move toward the disc in a constant ratio as temperature increases. The current to resistive heating devices can also be controlled by the controller 1008 in FIG. 9. A Peltier device is used to advantageously actuate the write and reader independently at different rates depending upon the operation mode (read, write or idle).

The Peltier device is built nominally in between the writer and reader structures. The Peltier device current is driven in either the forward direction or the backward direction. In the forward direction, the device creates a thermal gradient relatively heating a first side and cooling the other side. In the backward direction, the device cools the first side and heats the second side. In the forward direction, the transducer on the cold side retracts the cold transducer relatively from the disc surface while the transducer on the hot side will protrude toward the disc surface. In the backward current direction, the effect is reversed.

In the examples shown above in FIGS. 3-9, a Peltier device is placed for conducting heat between a reader and a writer of a magnetic recording component. The Peltier device is driven in both a forward direction where a first side of the Peltier device gets cooled relative to a second side of the Peltier device, and in the reverse direction where the second side of the Peltier device gets cooled relative to the first side of the Peltier device.

In magnetic recording components in which only heaters are used, the ratio of the writer actuation (change of protrusion) to the reader actuation (change of protrusion) is labeled gamma (Γ). Activating the heater causes both transducers to move toward the disc with the transducer on the trailing edge of the head (typically the writer) moving farther than the transducer closer to rest of the thermally massive head (typically the reader). Regardless of the relative motion of the two transducers, both transducers move in concert, and Γ is substantially fixed and not controllable by the heater.

By using a Peltier device driven in both directions as described above in connection with examples in FIGS. 3-9, the movement of the transducers is, to a certain extent, independently controllable. For example, with a typical resistive heater, the writer has more displacement than the reader as temperature increases, and the ratio Γ of displacements is not controllable. The Peltier device can be operated in the forward direction relatively cooling the writer side and heating the reader side actuating the reader closer to the disc and Γ is controllable.

The Peltier device does not need to be particularly efficient. Even a small temperature gradient of 20 degrees Celsius can have a useful effect on protrusion. For a resistive heater example where there is a relatively fixed gamma of one, both read and write transducers will displace the same distance for a 20 degree Celsius temperature rise of both read and write transducers. Alternatively, a Peltier device generates a 20 degree Celsius difference between the read and write transducers, the cooler side could have a temperature decrease of 80 degrees Celsius and the hot side a temperature increase of 100 degrees Celsius. Because the thermal expansion is mostly linear, the cold side would expand 80% for a gamma of 0.8 instead of one.

The disclosed structure of a Peltier device cooling a first transducer while it heats a second transducer is applicable to magnetic recording heads built as writer over reader (usual stacking order) or reader over writer (trailing edge reader, reverse stacking order). The Peltier device does not need to be placed symmetrically between the reader and the writer. With some geometries and material sets, the Peltier device can be placed outside of the two transducers and have some effectiveness at producing a gamma that can be varied in real time to optimize reading and writing modes.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data recording component while maintaining substantially the same functionality without departing from the scope and spirit of the present invention. In addition, although the preferred embodiment described herein is directed to a magnetic data recording component for magnetic disc drives, it will be appreciated by those skilled in the art that the teachings of the present invention can be applied to magnetooptical data recording components, without departing from the scope and spirit of the present invention.

What is claimed is:

1. A data recording component, comprising:
   read and write transducers mounted on a head, the read transducer having a reader edge protrusion relative to the head and the write transducer having a writer tip protrusion relative to the head;
   a Peltier device that is mounted on the head and that generates an internal heat flow that is internal to the Peltier device between first and second Peltier junctions;
   a first thermal conductor that conducts a first external heat flow along a first heat conduction path between the first junction and the read transducer, and a second thermal conductor that conducts a second external heat flow along a second heat conduction path, separate from the first heat conduction path, between the second junction and the write transducer;
   a controlled current source that provides a current to the Peltier device, the current changing polarity to change directions of the internal and external heat flows.

2. The data recording component of claim 1 wherein the first thermal conductor comprises an electrically insulating layer with a thickness in the range of 2 nanometers to 1000 nanometers.

3. The data recording component of claim 1 wherein the first thermal conductor comprises a metal layer.

4. The data recording component of claim 3 wherein the first theintal conductor extends across a spacing between the Peltier device and the read and write transducers.

5. The data recording component of claim 1 and further comprising a thermal insulator layer that insulates the read and write transducers from one another.

6. The data recording component of claim 2 wherein the gamma ratio comprises a ratio of writer tip protrusion change to reader edge protrusion change per unit temperature change of a temperature of the data recording component.

7. The data recording component of claim 1 wherein the current has a first polarity during a data reading interval, and the current has a second opposite polarity during a data writing interval.

8. The data recording component of claim 1 wherein the current is shut off during idle periods when neither data reading nor data writing is taking place, and the current is temporarily turned on during data reading and data writing intervals.

9. The data recording component of claim 1 wherein the change of directions of internal and external heat flows varies a gamma ratio of reader edge and writer tip protrusions.

10. A data recording component, comprising:
    read and write transducers mounted on a head, the read transducer having a reader edge protrusion relative to the head and the write transducer having a writer tip protrusion relative to the head;
    a Peltier device that is mounted on the head and that generates an internal heat flow that is internal to the Peltier device between first and second Peltier junctions;
    a controlled current source that provides a current to the Peltier device, the current changing polarity to change directions of the internal heat flow;
    the Peltier device simultaneously heating the read transducer and cooling the write transducer when the current is controlled to flow in a first direction; and the Peltier device simultaneously heating the write transducer and cooling the read transducer when the current is controlled to flow in a second opposite direction, the control of the current varying a gamma ratio.

11. The data recording component of claim 10 and further comprising a thermal insulator layer that insulates the read and write transducers from one another.

12. The data recording component of claim 10 wherein the current flows in the first direction during a data reading interval, and the current flows in the second direction during a data writing interval.

13. The data recording component of claim 10 wherein the current is shut off during idle periods when neither data reading nor data writing is taking place, and the current is temporarily turned on during data reading and data writing intervals.

14. The data recording component of claim 10 and further comprising:
thermal conductors that conduct external heat flows between the first junction and the read transducer, and between the second junction and the write transducer.

15. The data recording component of claim 14 wherein the thermal conductors comprise electrically insulating layers with thicknesses in the range of 2 nanometers to 1000 nanometers.

16. The data recording component of claim 14 wherein the thermal conductors comprise metal layers that extend across a spacing between the Peltier device and the read and write transducers.

17. A method of controlling a gamma ratio in a data recording component, comprising:
providing a read transducer having a reader edge protrusion, and a write transducer having a writer tip protrusion;
providing a Peltier device that generates an internal heat flow that is internal to the Peltier device between first and second Peltier junctions;
providing a current to the Peltier device, the current changing polarity to change directions of the internal heat flows;
simultaneously heating the read transducer and cooling the write transducer when the current is controlled to flow in a first direction; and simultaneously heating the write transducer and cooling the read transducer when the current is controlled to flow in a second opposite direction, the control of the current varying the gamma ratio of the reader edge and writer tip protrusions.

18. The method of claim 17 and further comprising:
thermally insulating the read and write transducers from one another.

19. The method of claim 17 and further comprising:
controlling the current to a first polarity during a data reading interval, and controlling the current to a second opposite polarity during data writing interval.

20. The method of claim 17 and further comprising:
shutting the current off during idle periods when neither data reading nor data writing is taking place, and turning on the current during data reading and data writing intervals.

* * * * *